UNITED STATES PATENT OFFICE.

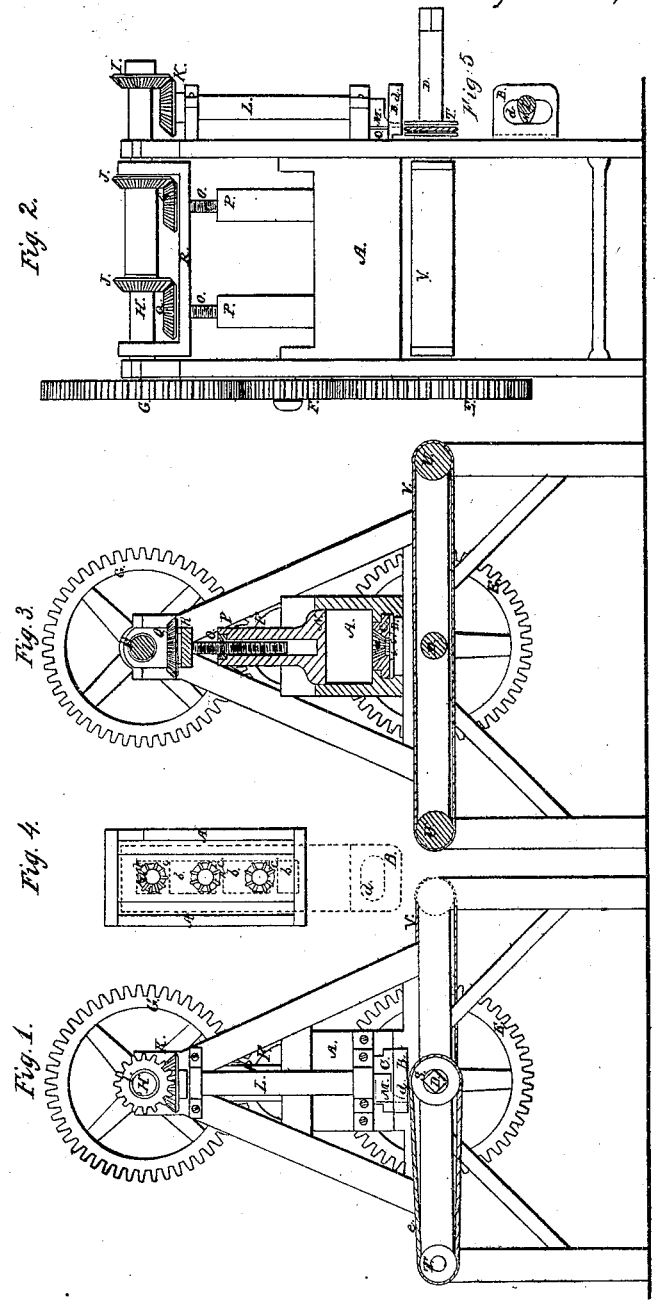

THEODORE SLOAT, OF BROOKLYN, E. D., NEW YORK.

IMPROVED CRACKER-MACHINE.

Specification forming part of Letters Patent No. 89,250, dated April 20, 1869.

*To all whom it may concern:*

Be it known that I, THEODORE SLOAT, of Brooklyn, E. D., in the county of Kings and State of New York, have invented a new and useful Improvement in Machines for Making Crimp and other Crackers, of which the following is a full, clear, and exact description, reference being had to the accompanying drawing, forming part of this specification, and in which—

Figures 1 and 2 represent elevations at right angles to each other of a cracker-making machine constructed in accordance with my invention, and Fig. 3 a sectional elevation of the same, taken transversely through Fig. 2. Fig. 4 is a plan of the false bottom to the dough-box detached and knife or sliding cutter, arranged under it; and Fig. 5, a plan of the driving end of the knife, with its operating-crank arranged therein.

Similar letters of reference indicate corresponding parts.

My invention consists in a novel construction and arrangement of various parts or devices, as hereinafter described, for cutting dough into crackers as it discharged from a box through the action of a platen or presser.

Referring to the accompanying drawing, the dough to be made into crackers is put into a box, A, secured to or seated on the main frame of the machine. Said box is made open, both top and bottom, and has a perforated knife or slide, B, arranged to slide longitudinally and intermittently within it at or near its bottom, and below a longitudinally-adjustable and removable false bottom, C, which is provided with a series or any number of openings, *a*, in or through it, corresponding to the shape and size of the crackers to be made, the dough being forced through said openings by a presser or plunger, as hereinafter described, and, as it protrudes through them and through the perforations *b* in the knife or slide, being cut or sliced off in required thicknesses to form the crackers. Said knife or slide is formed in one piece, with bars *c* crossing the perforations in it, to constitute cutters.

The false bottom C is made capable of being slid into and out of the dough-box longitudinally, to give to the openings *a* through it a proper position relatively to the cutting-bars of the knife or slide B working under it, and to admit of its withdrawal and substitution of another false bottom having different sizes or shapes of openings through it, for making a different form or size of cracker. It is desirable that these openings *a* should be flaring or bell-mouthed at their tops, to facilitate the entry of the dough, also necessary that they should be crimped at their edges when what are termed "crimp-crackers" are to be made.

D is a main driving-shaft, carrying on its one end a spur-wheel, E, which meshes into a pinion, F, that gears with a spur-wheel, G, on an upper shaft, H. This latter shaft carries bevel wheels or pinions I and J J. The one, I, of these wheels gears with a bevel-wheel, K, on a vertical shaft, L, which carries a crank or cam, M, at its lower end, arranged to rotate within a slot, *d*, in the knife B, to give to the latter its necessary successive intermittent actions for cutting or slicing off the dough to form the crackers. This crank M may be adjustable or changeable to alter the throw for the purpose of giving to the knife different lengths and varied timely dispositions of stroke, to adapt it to different-sized crackers, the apertures *b* in the knife being sufficiently large to suit different sizes of crackers.

The platen, presser, or plunger N, which serves as it descends to force out the dough from the box A through the openings *a*, is operated by means of jack-screws O O working in boxes P P, that project upward from the platen. These screws are rotated by means of bevel wheels or pinions Q Q on the upper ends of them through or by the bevel-pinions J J on the shaft H. Not only the platen N, but the jack-screws O O, with their boxes P P and bevel-wheels Q Q, are all suspended or carried by a swinging frame, R, which is freely hung on the shaft H. This forms a very compact and advantageous arrangement, to admit of the platen being swung to one side when raised out of the dough-box for the introduction of a fresh charge of dough, the bevel-pinions Q Q during such swinging action remaining in gear with the wheels J J, and the operating-screws, by swinging the platen, always preserving their proper relationship thereto. Of course, the platen is raised or lowered, according to the direction in motion given to the main shaft D. On this main shaft is a pulley, S, which communicates motion, by belt e, to a pulley, T, that serves to drive or is connected with one of two rollers, U U, for the purpose of giving motion to an endless apron, V, which carries off the crackers as they are made.

What is herein claimed, and desired to be secured by Letters Patent, is—

1. The arrangement and combination of the vertical shaft L, crank M, and bevel-pinions I K, for operating the sliding knife B by or from the shaft H, substantially as shown and described.

2. The combination of the longitudinally-adjustable and removable perforated false bottom C to the dough-box A with the intermittently-reciprocating knife or slide B, having apertures b, and formed with a series of cutting-bars, c, arranged to play beneath the perforations a in the false bottom, essentially as shown and described, and for the purposes set forth.

THEODORE SLOAT.

Witnesses:
  HENRY T. BROWN,
  HENRY PALMER.